H. B. GOGERTY.
STOCK-WATERER.
APPLICATION FILED SEPT. 14, 1920.
1,394,617.
Patented Oct. 25, 1921.
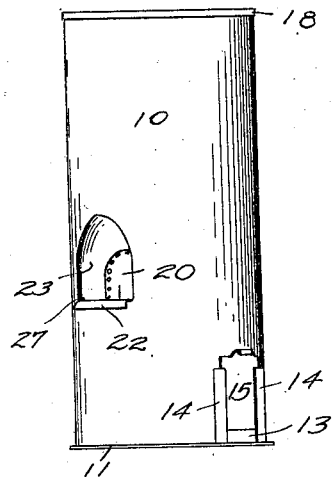
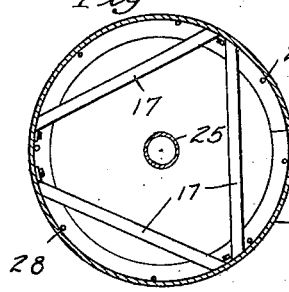
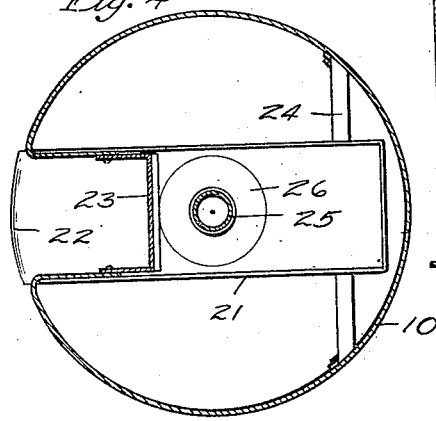
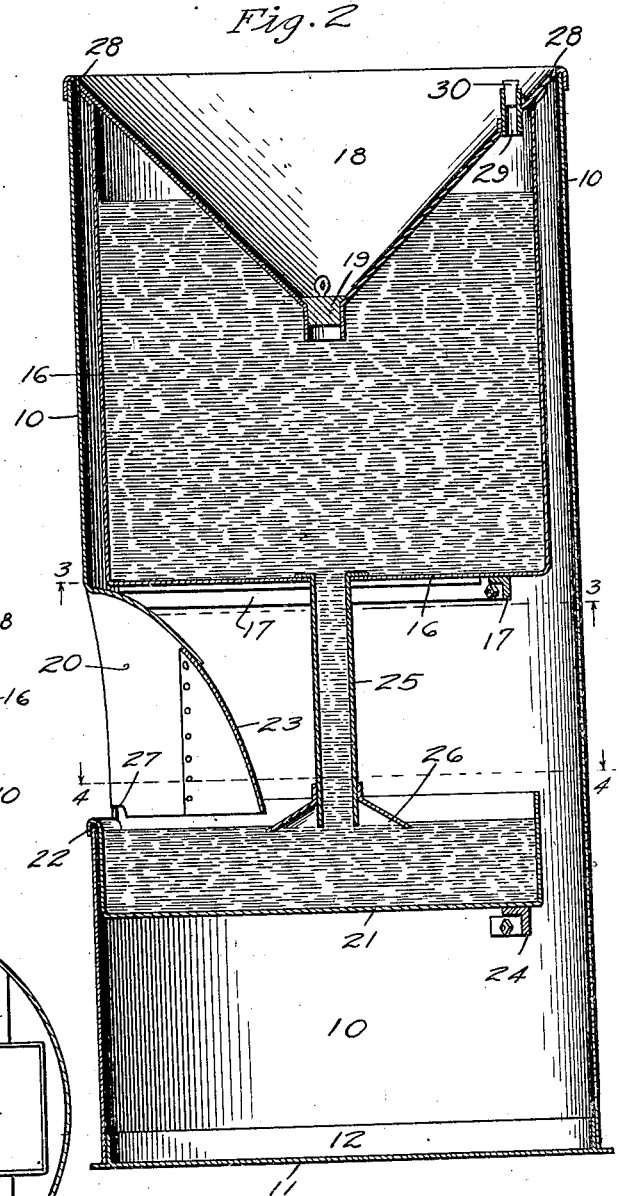
Inventor
Henry B. Gogerty
By Bair & Freeman - Attorneys
Witness
Lynn Latta

UNITED STATES PATENT OFFICE.

HENRY B. GOGERTY, OF DES MOINES, IOWA.

STOCK-WATERER.

1,394,617. Specification of Letters Patent. Patented Oct. 25, 1921.

Application filed September 14, 1920. Serial No. 410,192.

*To all whom it may concern:*

Be it known that I, HENRY B. GOGERTY, a citizen of the United States, and a resident of Des Moines, in the county of Polk and State of Iowa, have invented a certain new and useful Stock-Waterer, of which the following is a specification.

The object of my invention is to provide a stock waterer particularly adapted for use for hogs, which device is of simple, durable and inexpensive construction.

Still a further object of my invention is to provide a watering device, having a watering tank and a removable trough arranged to receive water from the tank, the trough being so arranged that it may be moved to position where it will be possible to remove it from the watering device.

Still a further purpose is to provide co-acting means for supporting the trough in such a way that it may be quickly and easily removed for cleaning.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows an elevation of the watering device.

Fig. 2 shows a vertical, sectional view through the same.

Fig. 3 shows a horizontal, sectional view taken on the line 3—3 of Fig. 2.

Fig. 4 shows a horizontal, sectional view taken on the line 4—4 of Fig. 2.

In the accompanying drawings I have used the reference numeral 10 to indicate generally the casing, forming the outside part of my watering device.

The casing 10 has a removable bottom 11, formed with an upwardly projecting flange 12, which fits just inside the lower part of the casing 10.

In the lower wall of the casing 10 is an opening 13 adjacent to which on the outside of the casing are spaced guides 14, in which is slidingly mounted a door or closure member 15, which opening and door are provided for moving the lamp in and out and giving access to the lamp or other heater.

Supported in the upper part of the casing 10 is a tank 16, which rests on the angle iron cross members 17.

I provide a common top 18 for the tank 16 and casing 10, which is funnel shaped and is provided at its lower central part with a cork 19 or other suitable closure device.

Below the tank 16 there is provided in the wall of the casing 10, an opening 20 for permitting animals to have access to the trough hereinafter disclosed.

I provide a removable trough 21, substantially rectangular in outline, as indicated in Figs. 2 and 4. The front end of the trough 21 is curved to fit the wall of the casing 10, and is provided at its upper portion with a downwardly extending channel shaped member 22 which fits over the edge of the casing 10.

At the top of the opening 20 extending inwardly from the upper and side parts of the opening 20 is a shield 23, which projects downwardly into the trough 21, as shown in Figs. 1, 2 and 4.

The rear part of the trough 21 rests upon an angle iron support 24.

In the bottom of the tank 16 is a hole, from which extends downwardly a pipe or tube 25, the lower end of which projects into the trough 21 when the latter is installed.

Surrounding the lower end of the tube or pipe 25 is a member 26 having substantially the shape of an inverted funnel. As indicated the lower edge of the member 26 is sometimes below the lower end of the tube 25.

It may be mentioned at this time that the front wall of the trough 21 is somewhat lower than the side and rear walls thereof, and that the pipe 25 and member 26 project below the level of the upper edge of the front wall of said trough.

It will be noted also that the shield 23 projects below the upper edges of the side walls of the trough.

Near the trough the shield 23 is provided with notches 27 to permit the front wall of the trough to be raised for removing said trough.

In the practical use of my improved watering device, the tank and trough are installed as shown in Fig. 2 and any suitable heater is placed under the trough in the compartment formed at the lower part of the casing.

The water in the trough is entirely received within the casing and is of course subject to the greatest heat from the heater. The heat, however, travels upwardly around the tank 16.

Small ventilating holes 28 may be provided in the cover 18 between the casing 10 and the tank 16.

Some of the heated air also will pass between the lower edge of the shield 23 and the water in the trough.

The arrangement of the shield 23 prevents too rapid an escape of the heated air and also forces the escaping hot air to pass close to the surface of the water in the trough 21, which is most exposed to the cold outside air.

In the cover 18 there is provided a vent 29, which is ordinarily closed by a cork 30 or other suitable closure member.

The water in the tank 16 will flow downwardly through the pipe 25 into the trough 21 until the water in said trough rises to the lower end of said pipe, whereupon a water seal is formed, and the flow of water from the tank 16 is automatically stopped.

I have found that the water seal is best maintained, and more evenly maintained by using the funnel shaped member 26, arranged so as to leave an air cushion between the pipe 25 and the lower interior of the member 26.

When animals drink from the trough 21, thereby removing the water therefrom, it will of course be obvious that when the water is lowered in the trough until air can pass upwardly through the pipe 25, more water will then flow downwardly from the tank 16 until the trough is again filled to the proper level and the water seal reëstablished.

If it is desired to take out the trough 21 at any time, the tube 25 is plugged or the water is first removed from the device by tilting the casing 10 forwardly or otherwise, and the trough 21 may then be removed by lifting the forward portion thereof until the channel shaped member 22 clears the lower edge of the opening 20, whereupon the trough may be slid inwardly a very short distance, so that it is entirely within the casing 10, and when in this position may then have its forward end lowered until it is substantially vertical, whereupon the rear end will clear the cross support 24, and can then be removed from its support.

The bottom 12 may be removed for removing the trough 21. The trough 21 may be removed whenever it is desired to do so for cleaning or repairing such trough.

It will be seen that my watering device is of very simple and relatively inexpensive construction.

The trough is so mounted within the casing as to prevent any accidental misplacement thereof, and yet so as to permit the easy removal of the trough for repairs, replacement, cleaning, etc.

Some changes may be made in the construction and arrangement of the various parts of my improved stock waterer without departing from the essential features and purposes of my invention, and it is my intention to cover by my claims any modified forms of structure or use of mechanical equivalents, which may be reasonably included within their scope.

I claim as my invention:

1. In a waterer a casing, a tank in the upper part thereof spaced from the wall of said casing, a cover for said tank and casing, said casing having an opening in its wall below said tank, a trough having at its forward end means for co-acting with said casing for supporting said trough, a supporting member on said casing below the rear end of said trough, said trough being of less length than the diameter of said casing, a tube leading from said tank into said trough, the parts being so arranged that the trough may be raised at the forward end, slid off said support and then lowered into the lower part of said casing.

2. In a waterer a casing, a tank in the upper part thereof spaced from the wall of said casing, a cover for said tank and casing, said casing having an opening in its wall below said tank, a trough having at its forward end means for co-acting with said casing for supporting said trough, a supporting member on said casing below the rear end of said trough, said trough being of less length than the diameter of said casing, a tube leading from said tank into said trough, the parts being so arranged that the trough may be raised at the forward end, slid off said support and then lowered into the lower part of said casing, a removable bottom member on said casing.

Des Moines, Iowa, August 24, 1920.

HENRY B. GOGERTY.